United States Patent [19]

Yamazaki

[11] 4,275,280
[45] Jun. 23, 1981

[54] BRAKE SWITCH ACTUATOR FOR AUTOBICYCLE OR THE LIKE

[75] Inventor: Yuzo Yamazaki, Ueda, Japan

[73] Assignee: Nissin Kogyo Kabushiki Kaisha, Ueda, Japan

[21] Appl. No.: 35,225

[22] Filed: May 2, 1979

[30] Foreign Application Priority Data

May 17, 1978 [JP] Japan .............................. 53-66161[U]
Jul. 25, 1978 [JP] Japan ............................ 53-102052[U]

[51] Int. Cl.³ .............................................. H01H 9/06
[52] U.S. Cl. .................................. 200/61.85; 74/488; 200/61.87; 340/134
[58] Field of Search .... 123/198 D, 198 DA, 198 DB; 200/157, 153 T, 61.85, 61.87, 61.89; 340/134, 60, 66, 69, 71; 74/488, 489

[56] References Cited

U.S. PATENT DOCUMENTS 3,935,930  2/1976  Kine ..................................... 188/344

FOREIGN PATENT DOCUMENTS 604736  4/1976  U.S.S.R. .................................. 340/134

Primary Examiner—J. V. Truhe
Assistant Examiner—Morris Ginsburg
Attorney, Agent, or Firm—Haseltine and Lake

[57] ABSTRACT

A brake switch actuator for an autobicycle or the like is disclosed which includes a brake lever adapted to actuate a brake master cylinder mounted on a steering handle and also to actuate a brake switch so as to turn on and off a brake lamp at the tail of the body. The body of a brake master cylinder arranged frontwardly of a brake switch is disposed below the master cylinder with its longitudinal axis transverse to the longitudinal axis of the cylinder bore and also transverse to the longitudinal axis of the pivot, the brake lever having a downwardly extending arm which performs the dual function of operating the switch and also providing a stop which determines the retracted position of the brake lever.

4 Claims, 5 Drawing Figures

BRAKE SWITCH ACTUATOR FOR AUTOBICYCLE OR THE LIKE

BACKGROUND OF THE INVENTION

1. Field of the Invention

The present invention relates to an actuator for a brake switch which is arranged in a brake master cylinder mounted on the steering handle of an autobicycle or the like in order to turn on and off a brake lamp at the tail of the body.

2. Description of the Prior Art

It has been heretofore known in motorcycles that a cylinder body of a brake master cylinder mounted on the steering handle has a brake lever pivotally supported thereon to operate a piston therein, and a brake switch interlocked with the brake lever. In this case, since the above-mentioned three members, the piston, brake lever, and brake switch, are arranged on the same plane, the cylinder body on which the above-mentioned three members are supported is partly largely spread in plane to impair an external appearance, and in addition, the cylindrical brake switch has to be arranged obliquely to an axis of a cylinder bore accommodating therein the piston so as not to interfere with the piston in terms of arrangement. This arrangement is not desirable in fabrication and poses a drawback which fails to attain a machining accuracy as desired.

SUMMARY OF THE INVENTION

It is an object of the present invention to provide a brake switch actuator used for autobicycles or the like, which is not suffered from those disadvantages noted above with respect to prior arts.

BRIEF DESCRIPTION OF THE DRAWINGS

The invention will be more fully comprehended from the following description when taken in conjunction with the accompanying drawings wherein.

The drawings show embodiments of the device in accordance with the present invention.

DESCRIPTION OF THE PREFERRED EMBODIMENTS

Figure 1:
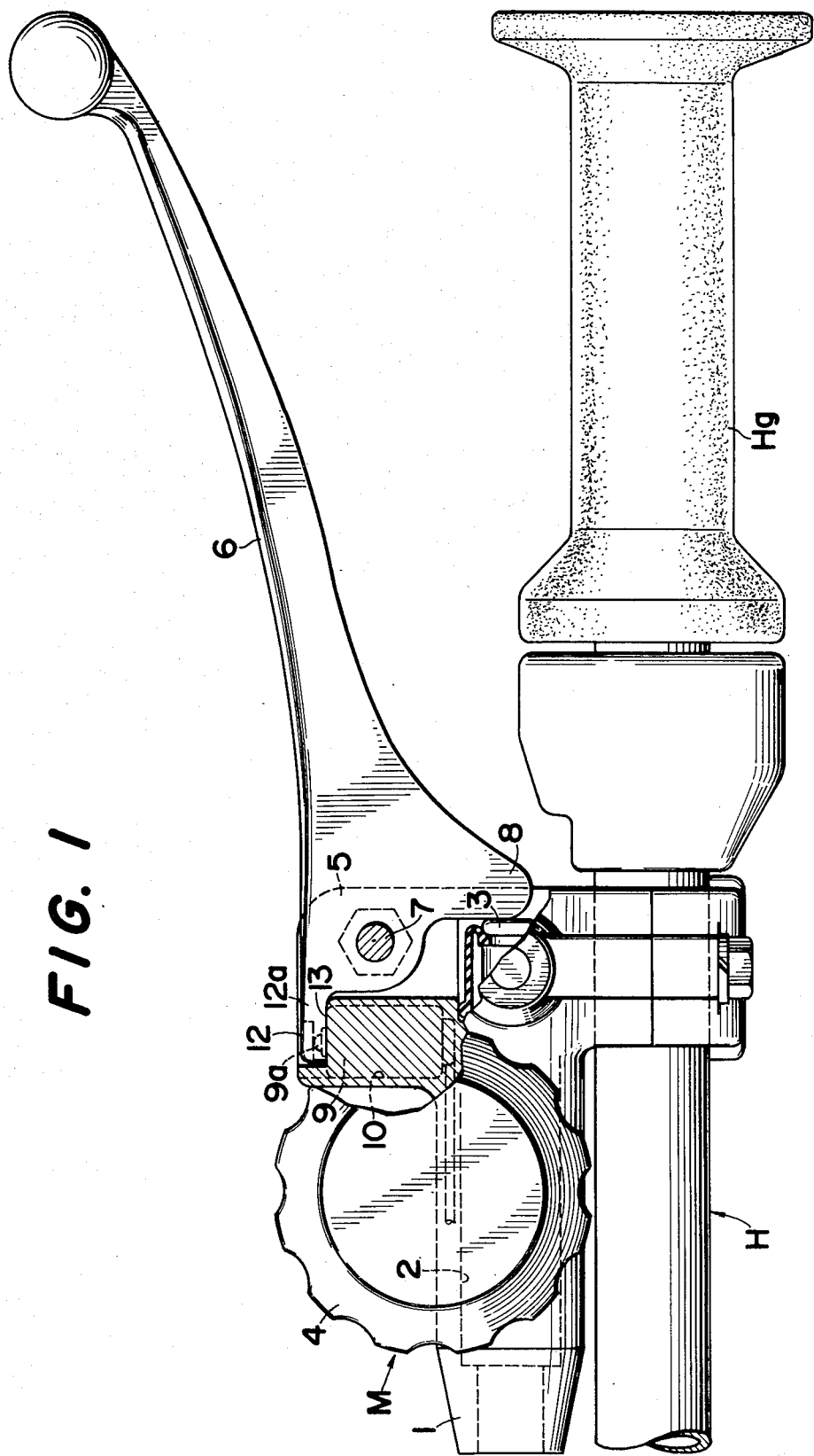
FIG. 1 is a partially cutaway plan view.
Figure 2:
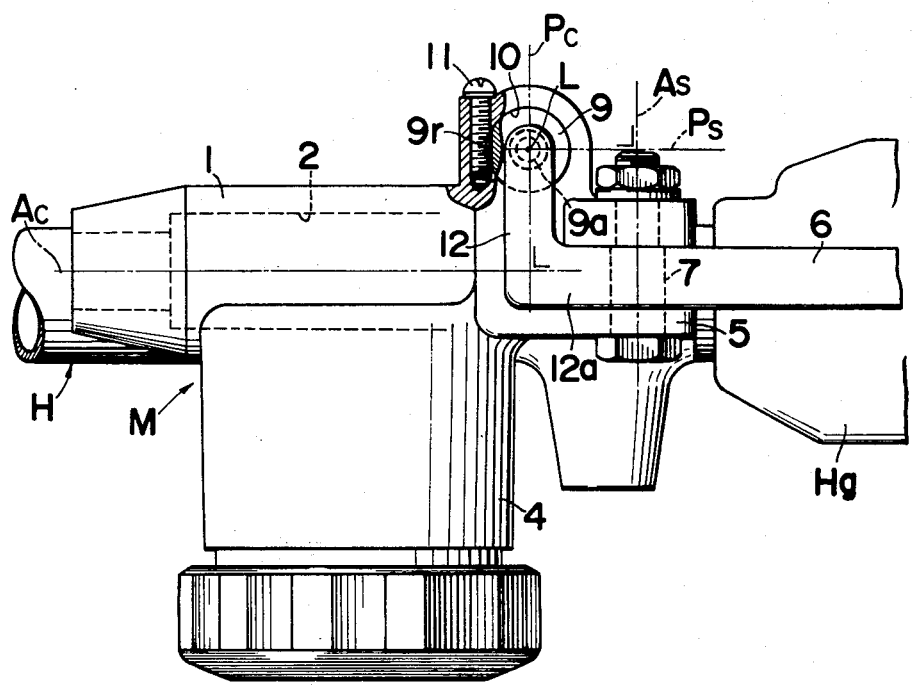
FIG. 2 is a partially cutaway front view.
Figure 3:
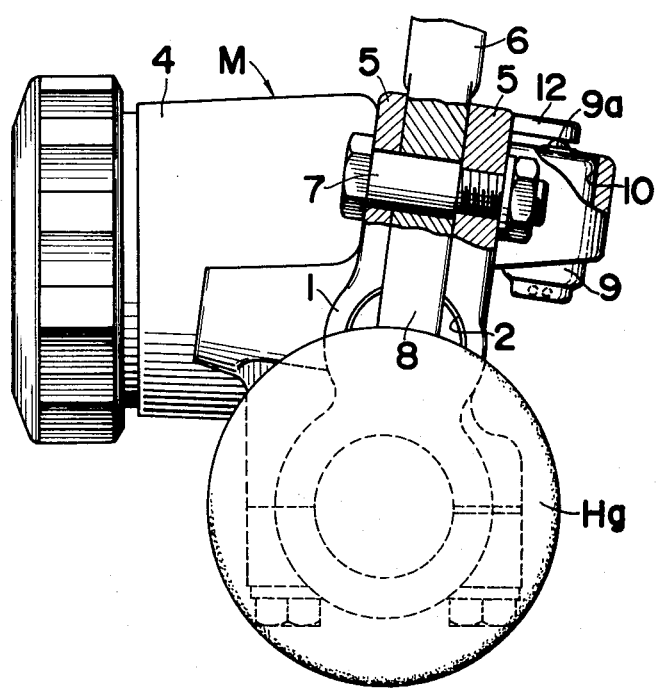
FIG. 3 is a partially cutaway right side view.

Referring now to FIGS. 1 through 3, the reference character H designates a rod-like steering handle of a motorcycle, on the front surface of which is provided with a brake master cylinder M adjacent a handle grip Hg at the end.

The brake master cylinder M has a cylinder body 1 formed with a cylinder bore 2 extending in parallel to the steering handle H, the cylinder bore 2 slidably accommodating therein a piston 3 which generates braking oil pressure as the piston advances.

The cylinder body 1 is integrally provided at its upper side with an oil tank 4, and the grip Hg is integrally provided at its side end with a pair of frontwardly extending upper and lower lever holders 5 and 5, the lever holders 5 and 5 having a base end of a brake lever 6 inserted therebetween pivotally supported by a pivot 7.

The brake lever 6 is provided at its base end with a piston operating arm 8 in abutment with an outer end of the piston 3 so that when turned towards the handle grip Hg, the piston operating arm 8 causes the piston 3 to advance to actuate a hydraulic brake of a wheel (not shown).

The cylinder body 1 is further formed with a switch housing 10 to accommodate therein a substantially cylindrical brake switch 9, said switch housing having the same shape as the brake switch, and the housing 10 or the brake switch 9 is arranged below (above in the figure) the cylinder bore 2 and on an intersection L between a plane Pc at a right angle to an axis Ac of the cylinder bore 2 and a plane Ps at a right angle to an axis Ac of the pivot 7. The brake switch 9 has a locating concave portion 9r externally thereof so that one side of a set screw 11 threadably mounted on the side wall of the switch housing 10 is brought into engagement with the concave portion 9r thereby locating and locking the switch 9 to the switch housing 10. The brake switch 9 has a movable switch lobe 9a projected from the front end thereof.

Figure 4:
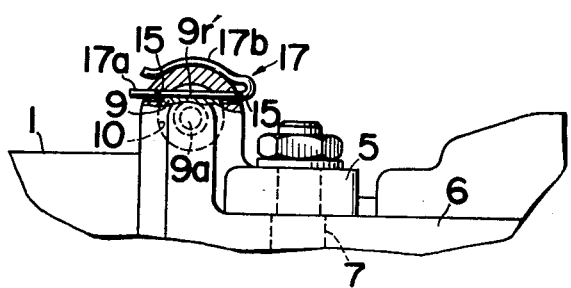
FIGS. 4 and 5 are respectively partially cutaway fragmentary front view and fragmentary right side view showing another embodiment of a mounting construction of a brake switch.
Figure 5:
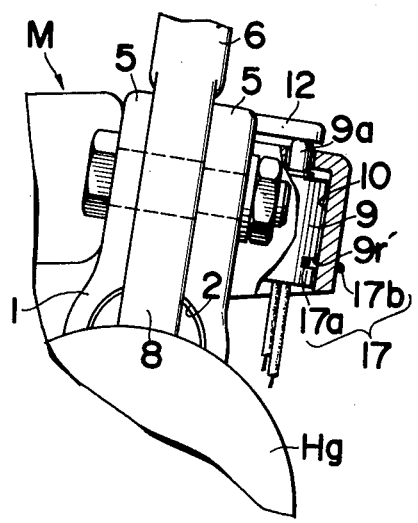

FIGS. 4 and 5 show a further embodiment of the mounting construction of the brake switch 9. In this construction, a locating cut groove 9r' tangential to an external surface of the brake switch 9 is provided, pin holes 15, 15 are bored in the switch housing 10 which extend through the side wall thereof tangentially into communication with the cut groove 9r', a straight line portion 17a of a snap pin 17 is inserted through the pin holes 15, 15 and cut groove 9r', and an elastic curve portion 17b is retained on the cylindrical external surface of the switch housing 10. In this way, the snap pin 17 allows its straight line portion 17a and curve portion 17b to hold the side wall of the switch housing 10 to prevent itself from slip-out, and allows its straight line portion 17a to prevent the brake switch 9 from rotation and slip-out. Thus, if the snap pin 17 is pulled out from the side wall of the switch housing 10 against the holding force thereof, the brake switch 9 can be taken out immediately from the housing 10, whereby when the switch 9 fails, it can be replaced easily. On the other hand, the brake lever 6 is provided at its base end with a downwardly extending L-shaped switch actuating arm 12 the end of which engages the movable switch lobe 9a, and the actuating arm 12 has a base portion 12a which also serves as a stop adapted to come into contact with a stop surface 13 formed on the front surface of the cylinder body 1 to determine the retracted position of the brake lever 6.

Now, in the retracted position of the brake lever 6 as shown in FIG. 1, the switch actuating arm 12 urges the movable switch lobe 9a of the brake switch 9 inwardly to open a contact in the brake switch 9 thus deenergizing the brake lamp at the tail of the motorcycle.

When the brake lever 6 is turned towards the handle grip Hg to actuate the brake master cylinder M, the switch actuating arm 12 is disengaged from the movable switch lobe 9a, and as a result, the movable switch lobe 9a protrudes outwardly to close the aforesaid contact to light the brake lamp, thus giving warning to succeeding vehicles that the brake has been actuated.

As described above, in the present invention, since the brake switch 9 is disposed below the cylinder bore 2 of the brake master cylinder M and on an intersection L between a plane Pc at a right angle to an axis Ac of the cylinder bore 2 and a plane Ps at a right angle to an axis of the pivot 7, it is possible to minimize the amount of protrusion of the brake switch 9 frontwardly of the cylinder body 1 to improve an external appearance and at the same time to miniaturize the brake master cylinder M. In addition, it is possible to simply obtain the accuracy, in terms of the manufacture, of the right angle arrangement in connection with the cylinder bore 2, brake switch 9 and pivot 7, and for this reason, the device can be manufactured in a very simple manner. Furthermore, since the brake lever 6 is provided with a switch actuating arm 12 which extends downwardly so as to engage the movable switch lobe 9a projecting from the front end of the brake switch 9, it is possible to accurately actuate the brake switch 9, despite the positioning of the latter downwardly from the cylinder bore 2.

What is claimed is:

1. A brake switch and actuator combination for autobicycle or the like comprising: a cylinder body of a brake master cylinder arranged frontwardly of a steering handle; a piston slidably accommodated in a cylinder bore of said cylinder body; a brake lever pivotally supported on one end of said cylinder body through a pivot so that said piston may be operated; a substantially cylindrical brake switch disposed below the cylinder bore with its longitudinal axis transverse to the longitudinal axis of the cylinder bore and also transverse to the longitudinal axis of the pivot; a movable member of the brake switch projected from a front end thereof; and a switch actuating arm formed on said brake lever and which has a downwardly extending portion engageable with said movable switch member, said switch actuating arm also constituting a stop which contacts a stop surface formed on said cylinder body to determine the retracted position of said brake lever.

2. The combination according to claim 1, wherein said cylinder body provides a housing for said switch, and said body and said housing are comprised by a unitary casting.

3. The combination according to claim 2, wherein a set screw is threadably received within a side wall of said switch housing and engages within a locating concave portion in an external surface of said brake switch to secure said brake switch within the switch housing.

4. The combination according to claim 2, comprising a tangential cut groove provided in an external surface of said brake switch, pin holes which extend through a side wall of said switch housing tangentially into communication with said cut groove, and a snap pin having a straight line portion and an elastic curved portion, said straight line portion of said snap pin being inserted through said cut groove and said pin holes, said elastic curved portion of said snap pin being retained on the external surface of said switch housing to secure said brake switch within said switch housing.

* * * * *